June 9, 1936.  J. H. WINDEMULLER  2,043,601
ELECTRIC COOKING OVEN
Filed Oct. 12, 1935
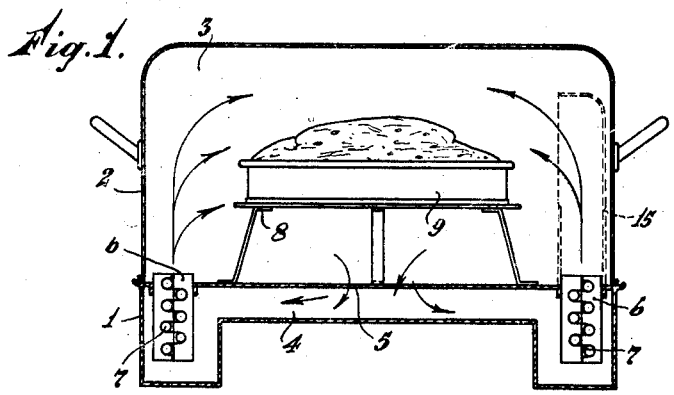
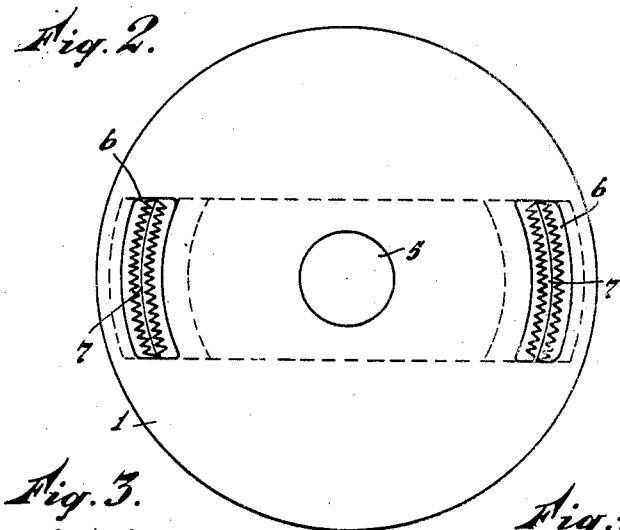
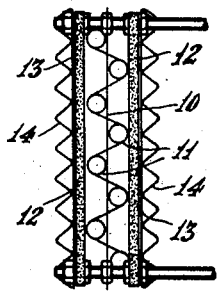
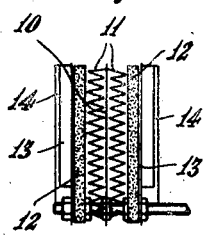
Inventor:
JAN HENDRIK WINDEMULLER
by Cox + Moore,
Attorneys.

Patented June 9, 1936

2,043,601

UNITED STATES PATENT OFFICE 2,043,601

ELECTRIC COOKING OVEN

Jan Hendrik Windemuller, The Hague, Netherlands, assignor to Maatschappij Van Berkel's Patent N. V., Rotterdam, Netherlands, a corporation of the Netherlands Application October 12, 1935, Serial No. 44,785
In the Netherlands February 27, 1933

2 Claims. (Cl. 219—35)

The invention relates to an electric oven, particularly for preparing eatables.

Although the electrically heated oven has the advantages that the oven space can be fully shut off from the open air, so that theoretically speaking it is sufficient to bring and keep the air in the oven space at the desired temperature, the ovens up, till now available for preparing eatables do not yield satisfactory results.

With the known ovens of this kind the electric heating elements are mostly arranged either above the material to be baked, whereby it is exposed, however, to an unallowable radiating heat, or placed in the middle of the oven space under the material to be baked and separated therefrom by an insulating layer. In the latter case it is then expected that above the material to be baked a sufficient hot air circulation will arise to bring the baking process to a good end. The object aimed at, however, is not obtained by means of an oven constructed in the described manner. The cause must be seen in the fact that the hot air ascending around the insulated layer will not be inclined to stream radially to the middle of the oven space, but, on account of its getting into touch with the side walls of the oven, exposed to cooling, along these walls downwardly.

The object of the invention is an improved arrangement of the heating elements, so that it is avoided that the material to be baked is exposed to radiating heat and yet such a circulation of air in the oven space is furthered that in this space practically everywhere an equal temperature is obtained, required for good baking results.

To this end the oven space shut off from the open air is on the one side connected by openings in the middle of its bottom and on the other side by openings arranged near the circumference of its bottom with a second lower space, while from the last mentioned openings tubes extend downwardly in the second space and electric heating elements are situated totally inside these tubes.

For elucidating the invention an embodiment of the oven will be described with reference to the drawing.

Fig. 1 is a vertical section through the oven.

Fig. 2 is a top view of the oven with the cover removed.

Fig. 3 is a front view and

Fig. 4 is a top view of an electric heating element.

According to the drawing the oven consists of a bottom piece 4 on which a loose cover 2 is arranged. The oven space 3, enclosed by the bottom piece and the cover, is totally shut off from the air.

The bottom piece 4 is provided with a central opening 5 and with openings 6 arranged near the edge of the bottom piece, connected with the oven space 3. In these openings 6 tubes are provided reaching downwardly. In each of these tubes an electric heating element 7 is arranged, totally inside the tube. By this arrangement a direct irradiation of the material to be baked is prevented and at the same time an economic use of electricity is obtained.

If the heating elements are made to glow and thus heat the air present in the tubes, this heated air will ascend into the oven space. The air escaping from the upper side of the tubes, however, is to be replenished at the lower side of the tubes. The air required to this end can only be sucked off from the oven space via the central opening 5 in the bottom of the oven space. From this follows a continuous and forced circulation of the air in the oven space, in which thus a practically homogeneous temperature will arise, so that the material to be baked 9, e. g. placed on a table 8, is exposed to an equal temperature at all sides.

To further an economic use of electricity it is advisable to make the heating elements as schematically illustrated in Figures 3 and 4.

According to these figures the heating element consists of spirally wound heating thread 11 arranged at both sides of a mica plate 10. This plate with heating thread is arranged between two walls, of which the two opposing sides consists of a layer of asbestos 12 or similar good heat insulating material. At the outside this layer is covered with a plate 13 of bad heat radiating but good heat conducting material. To increase the surface of this cover a corrugated plate 14 of the same material is arranged thereto in conductive connection.

By this construction the loss of heat by radiation is almost avoided.

Also the mouth of one end of the air channels can be situated in the sidewall of the oven or a tube shaped prolongation 15 of the channel 4 can be arranged on the mouth situated in the bottom piece, as indicated in Fig. 1 with dotted lines.

I claim:

1. In an electric oven a hollow enclosed base member including a top having a centrally located opening, and a plurality of tubular containers having open ends mounted in said top adjacent the edge, a cover coextensive with the top of the base member and forming with the base member a completely enclosed oven, food supporting means mounted in the oven above the opening and electric heating means mounted in said containers to heat and cause the air to circulate against the side and top of the food upon the supporting means and to pass downwardly through the opening into the hollow base to be reheated by the electric heating means.

2. In an electric oven, a hollow base member, a cover forming with the base member a completely enclosed oven space, a plurality of open ended tubular members connecting the interior of the base member adjacent the edge thereof with the interior of the cover, electric heating means mounted in said tubular means for heating the air therein and causing the air to flow upwardly from the base into the oven space, and an opening in the base member to provide a return passage for the air, whereby the air heated by the heating elements circulates about the oven space and downwardly into the base member to be reheated by the heating elements.

JAN HENDRIK WINDEMULLER.